(12) United States Patent
Coers et al.

(10) Patent No.: US 7,540,130 B2
(45) Date of Patent: Jun. 2, 2009

(54) HEIGHT CONTROL FOR A MULTI-SECTION CUTTING PLATFORM IN AN AGRICULTURAL HARVESTING MACHINE

(75) Inventors: Bruce Alan Coers, Hillsdale, IL (US); Roderick James Jensen, Moline, IL (US)

(73) Assignee: Deere & Company, Moline, IL (US)

( * ) Notice: Subject to any disclaimer, the term of this patent is extended or adjusted under 35 U.S.C. 154(b) by 461 days.

(21) Appl. No.: 11/366,031

(22) Filed: Mar. 2, 2006

(65) Prior Publication Data

US 2007/0204582 A1 Sep. 6, 2007

(51) Int. Cl.
*A01D 75/28* (2006.01)
(52) U.S. Cl. ............... 56/10.2 E; 56/10.2 R; 56/228
(58) Field of Classification Search .............. 56/10.2 R, 56/10.2 E, 134, 159, 228, 10.2 D, 10.2 F
See application file for complete search history.

(56) References Cited

U.S. PATENT DOCUMENTS 4,487,004 A * 12/1984 Kejr ........................... 56/14.4
4,641,490 A * 2/1987 Wynn et al. ................ 56/10.2 E
4,776,153 A * 10/1988 DePauw et al. ........... 56/10.2 E
6,615,570 B2 * 9/2003 Beck et al. ................ 56/10.2 E
6,758,029 B2 * 7/2004 Beaujot .................... 56/10.2 E
6,871,483 B1 * 3/2005 Panoushek ............... 56/10.2 E
2007/0193243 A1 8/2007 Schmidt et al.

\* cited by examiner

*Primary Examiner*—Alicia M Torres

(57) ABSTRACT

An agricultural harvesting machine includes a feeder housing and a cutting platform. The cutting platform includes a center platform section carried by the feeder housing. A first wing platform section extends laterally from one side of the center platform section, and a second wing platform section extends laterally from another side of the center platform section. A height control system includes a lift cylinder coupled with the feeder housing, a first tilt cylinder coupled between the center platform section and the first wing platform section, and a second tilt cylinder coupled between the center platform section and the second wing platform section. The lift cylinder, first tilt cylinder and second tilt cylinder are automatically adjusted independent from each other during harvesting operation of the cutting platform.

18 Claims, 4 Drawing Sheets

HEIGHT CONTROL FOR A MULTI-SECTION CUTTING PLATFORM IN AN AGRICULTURAL HARVESTING MACHINE

FIELD OF THE INVENTION

The present invention relates to agricultural harvesting machines, and, more particularly, to height control systems and methods for multi-section cutting platforms used with such machines.

BACKGROUND OF THE INVENTION

An agricultural harvesting machine such as a combine includes a head and a feeder housing which remove the crop material from the field, gather the crop material and transport the crop material to a separator. In the case of thinner stemmed crops such as soybeans, wheat, etc. which may be cut with a sickle bar carrying a plurality of knives, the head may also be known as a cutting platform. The separator removes the grain crop material from the non-grain crop material. The grain is cleaned and deposited in a grain tank. When the grain tank becomes full, an unloading auger which is positioned alongside the combine during harvesting is moved to the unloading position in which the auger extends approximately perpendicular to the longitudinal axis of the combine. The combine drives alongside a vehicle into which the grain is to be unloaded, such as a semi-trailer, and the unloading auger is actuated to discharge the grain into the vehicle.

A cutting platform may generally be of two types. One type typically has a sheet metal floor with a dual feed auger near the rear of the cutting platform for feeding the crop material longitudinally to the feeder housing. A cutting platform of this type with auger feed is more common.

Another type of cutting platform, also known as a draper platform, utilizes a flat, wide belt, referred to as a draper or draper belt to convey crop material. The arrangement and number of belts vary among platforms. One style of draper platform has two side belts that convey crop material longitudinally, to the center of the platform, where a center feed belt moves the crop material laterally into the feeder housing. Each belt is wrapped around a pair of rollers, one being a drive roller and the other being an idler roller. An example of this type draper arrangement is disclosed in U.S. Pat. No. 6,202,397, which is assigned to the assignee of the present invention.

An advantage of a draper platform is that larger amounts of crop material can be transported without plugging, etc. For example, with wide platforms approaching 40 feet or even larger, the amount of crop material transported to the feeder housing can be substantial. With an auger feed platform, the crop material may bind between the auger and the back wall of the platform. In contrast, with a draper platform, the crop material is carried on top of the belt with less chance for plugging.

Draper platforms currently in use have a rigid framework not allowing the framework to flex to any appreciable extent during use. The draper platform can be placed in a "float" position such that the cutterbar at the leading edge does not dig into the ground, but the leading edge of the platform itself cannot flex across the width of the platform as a result of uneven ground terrain. This results in some crop material being missed in ground depressions, etc., while also possibly causing a part of the cutterbar to dig into localized ground elevations (e.g., small mounds, etc.). Of course, missed crop material directly translates into missed revenue, and localized gouging of soil can cause additional repair expenses resulting from broken knives, knife guards, etc.

What is needed in the art is a draper platform which better follows the ground contour during operation, and a height control system which adjusts the height of the draper platform on a more localized basis.

SUMMARY OF THE INVENTION

The invention comprises, in one form thereof, an agricultural harvesting machine including a feeder housing and a cutting platform. The cutting platform includes a center platform section carried by the feeder housing. A first wing platform section extends laterally from one side of the center platform section, and a second wing platform section extends laterally from another side of the center platform section. A height control system includes a lift cylinder coupled with the feeder housing, a first tilt cylinder coupled between the center platform section and the first wing platform section, and a second tilt cylinder coupled between the center platform section and the second wing platform section. The lift cylinder, first tilt cylinder and second tilt cylinder are automatically adjusted independent from each other during harvesting operation of the cutting platform.

The invention comprises, in another form thereof, a method of operating a cutting platform in an agricultural harvesting machine, including the steps of: sensing a height of a first wing platform section using a first height sensor and providing a first output signal corresponding thereto; sensing a height of a second wing platform section using a second height sensor and providing a second output signal corresponding thereto; sensing a height of a center platform section using a third height sensor and providing a third output signal corresponding thereto; and automatically and independently adjusting a lift cylinder associated with the center platform section, a first tilt cylinder associated with the first wing platform section, and/or a second tilt cylinder associated with the second wing platform section, dependent upon the first output signal, second output signal and/or third output signal.

DETAILED DESCRIPTION OF THE INVENTION

Figure 1:
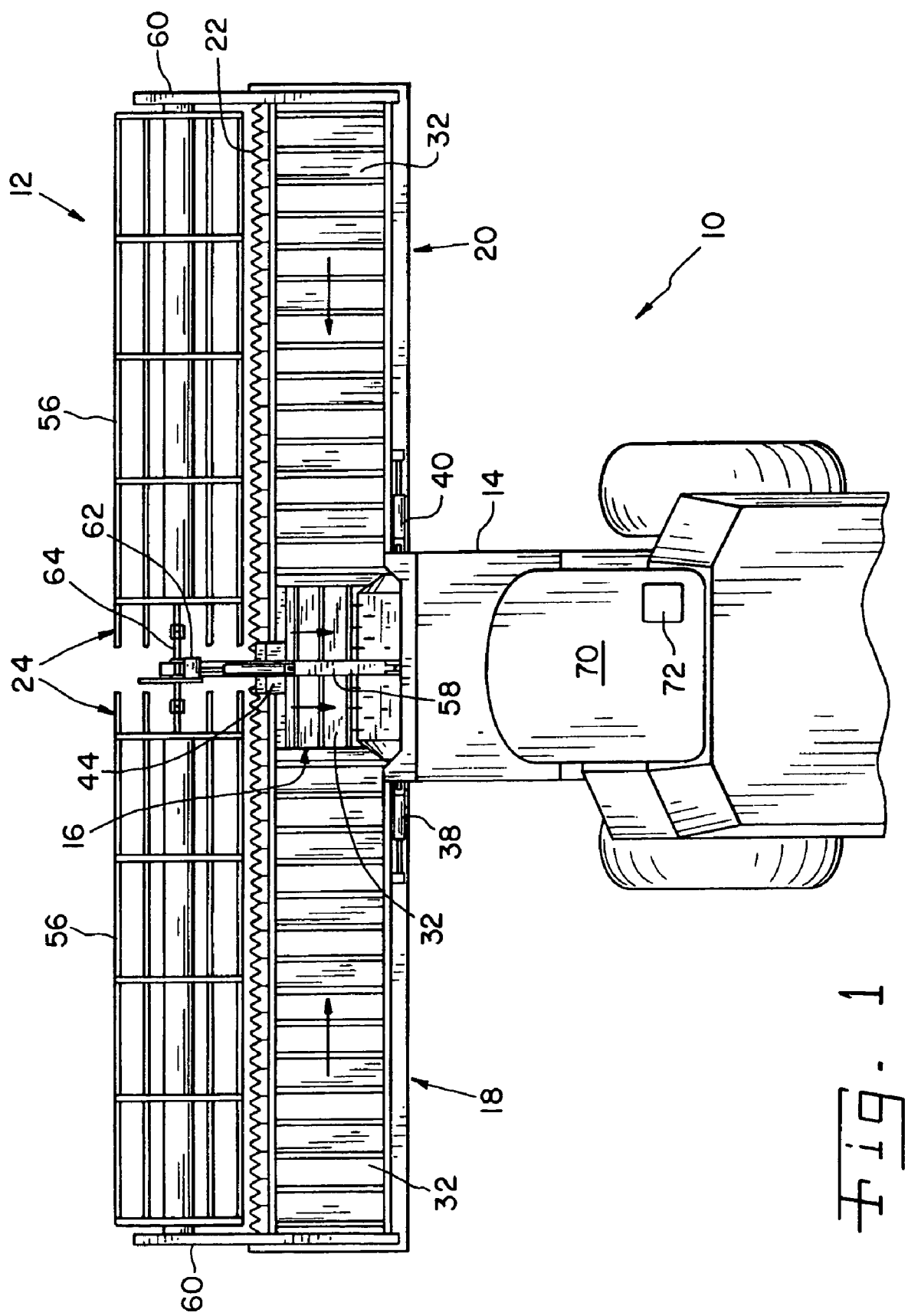
FIG. 1 is a fragmentary, top view of an agricultural combine including an embodiment of a draper platform of the present invention.
Figure 2:
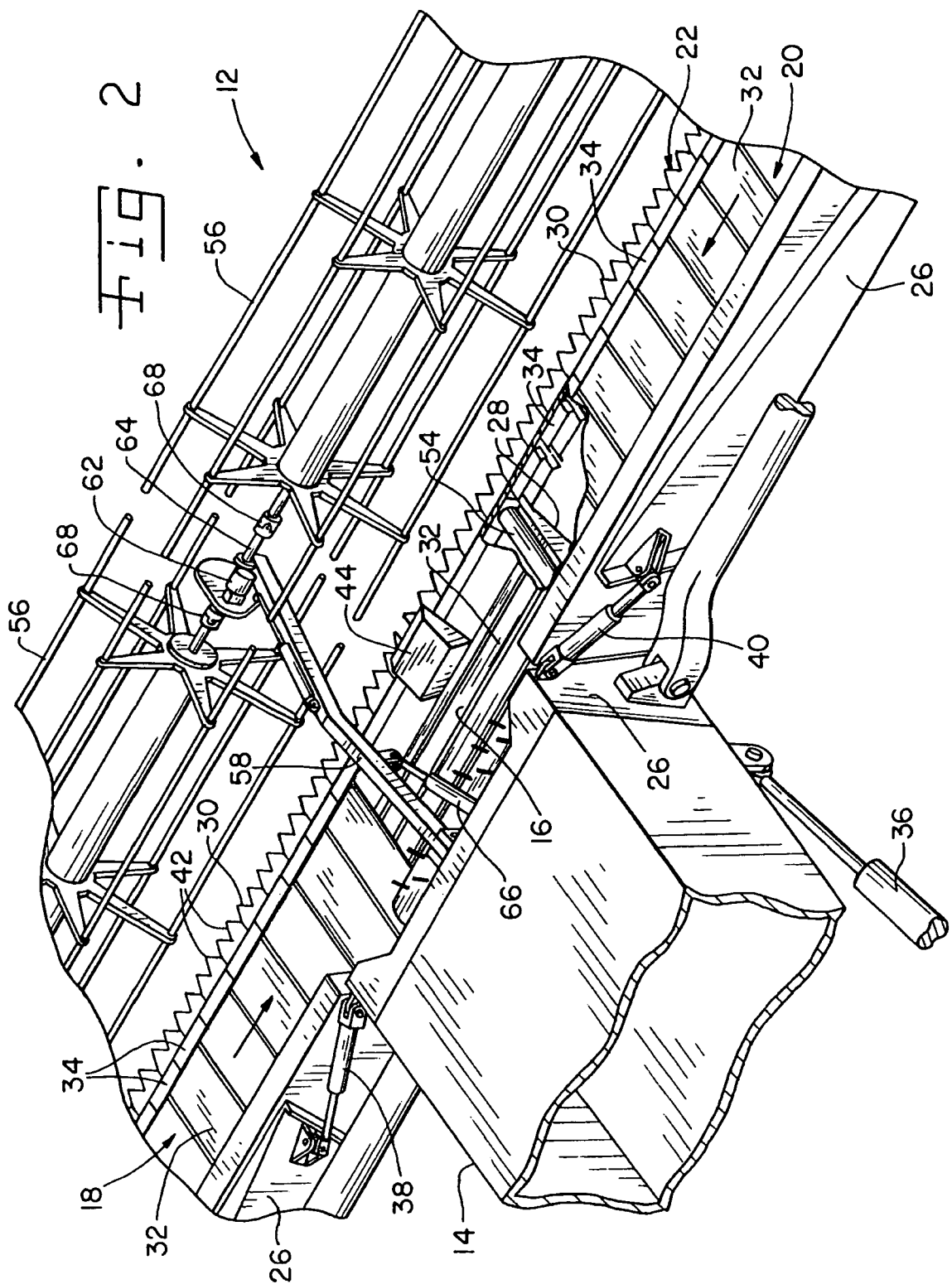
FIG. 2 is a fragmentary, perspective view of the agricultural combine of FIG. 1.

Referring now to the drawings, and, more particularly to FIGS. 1 and 2, there is shown an agricultural harvesting machine in the form of a combine 10 including an embodiment of a cutting platform 12 of the present invention. Combine 10 includes a feeder housing 14 which is detachably coupled with cutting platform 12. Feeder housing 14 receives the crop material from cutting platform 12, both grain and non-grain crop material, and transports the crop material to a separator within combine 10 in known manner (not shown). The grain crop material is separated from the non-grain crop material, cleaned and transported to a grain tank. The non-grain crop material is transported to a chopper, blower, etc. in known manner and distributed back to the field.

Cutting platform 12 generally includes a plurality of platform sections 16, 18 and 20, a cutterbar assembly 22 and a reel assembly 24. In the embodiment shown, platform section 16 is a center platform section, platform section 18 is a first wing platform section, and platform section 20 is a second wing platform section. Although shown with three platform sections, cutting platform 12 may be configured with more or less platform sections, depending upon the particular application.

Each platform section 16, 18 and 20 generally includes a frame 26, a plurality of float arms 28 coupled with a respective frame 26, a cutterbar 30 carried by the outboard ends of respective float arms 28, an endless belt 32, and a plurality of belt guides 34. The frame 26 of first wing platform section 18 and second wing platform section 20 are each pivotally coupled with center platform section 16, such that the outboard ends of first wing platform section 18 and second wing platform section 20 can move up and down independent from center platform section 16. To that end, a lift cylinder 36 coupled between the frame of combine 10 and feeder housing 14 lifts the entire cutting platform 12, a first tilt cylinder 38 coupled between the respective frame 26 of first wing platform section 18 and center platform section 16 pivotally moves first wing platform section 18 relative to center platform section 16, and a second tilt cylinder 40 coupled between the respective frame 26 of second wing platform section 20 and center platform section 16 pivotally moves second wing platform section 20 relative to center platform section 16.

Cutterbar assembly 22 includes two cutterbars 30 carried at the outboard ends of float arms 28 (i.e., at the leading edge of a platform section 16, 18 or 20). Each cutterbar 30 includes a plurality of knives 42 carried by a bar (not specifically shown). The particular type of knife can vary, such as a single blade knife (as shown) or a double blade knife. The bar is formed from a metal which is flexible to an extent allowing a desired degree of flexure across the width of cutting platform 12. In the embodiment shown, a majority of each cutterbar 30 is carried by a respective first wing platform section 18 or second wing platform section 20, with a lesser extent at the adjacent inboard ends of each cutterbar 30 being carried by center platform section 16. Cutterbars 30 are simultaneously driven by a single knife drive 44, providing reciprocating movement in concurrent opposite directions between cutterbars 30. A plurality of knife guards (not shown) are positioned in opposition to knives 42 for providing opposing surfaces for cutting the crop material with knives 42.

Float arms 28 may be pivoted at their connection locations with a respective frame 26. A float cylinder (not shown) coupled between a respective frame 26 and float arm 28 may be used for raising or lowering the outboard end of float arm(s) 28 at the leading edge of cutting platform 12. Each float cylinder may also be placed in a "float" position allowing the connected float arm 28 to generally follow the ground contour during operation. In this manner, the rams associated with each float cylinder are free to move back and forth longitudinally, thereby allowing float arms 28 to follow the ground contour. When not in a float mode, the float cylinders can be actuated to move float arms 28 in an upward or downward direction.

Each float arm 28 is also associated with a respective roller 54. The plurality of rollers 54 for each platform section 16, 18 and 20 carry and are positioned within a loop of a respective endless belt 32. At the inboard end of first wing platform section 18 and second wing platform section 20 is a driven roller, and at the outboard end of first wing platform section 18 and second wing platform section 20 is an idler roller. The rollers positioned between the inboard drive roller and outboard idler roller at each float arm 28 also function as idler rollers. It will be appreciated that the number of float arms 28, and thus the number of rollers 54, may vary depending upon the overall width of cutting head 12 transverse to the travel direction.

Reel assembly 24 includes two reels 56, center reel support arm 58 and a pair of outer reel support arms 60. Outer reel support arms 60 are pivotally coupled at one end thereof with an outboard end of a respective first wing platform section 18 or second wing platform section 20. Outer reel support arms 60 rotationally carry a respective reel 56 at an opposite end thereof. Each outer reel support arm 60 may be selectively moved up and down using a hydraulic cylinder, and the pair of hydraulic cylinders are typically coupled in parallel so that they move together upon actuation.

Center reel support arm 58 is pivotally coupled at one end thereof with center platform section 16 above the opening leading to feeder housing 14. Center reel support arm 58 rotationally carries an inboard end of each reel 56 at an opposite end thereof. A hydraulic motor 62 or other suitable mechanical drive rotationally drives each reel 56. More particularly, hydraulic motor 62 drives a common drive shaft 64 through a chain and sprocket or other suitable arrangement (not shown). The rotational speed of reels 56 can be adjusted by an operator by adjusting the rotational speed of hydraulic motor 62.

Center reel support arm 58 may be selectively moved up and down using a hydraulic cylinder 66. Center reel support arm 58 is movable independently from outer reel support arms 60. To accommodate this independent movement, drive shaft 64 driven by hydraulic motor 62 is coupled at each end thereof via a universal joint 68 with a respective reel 56. This independent movement of center reel support arm 58 can be accomplished manually using a separate actuating switch or lever in operator's cab 70, or automatically using an electronic controller 72 located within cab 70 or other suitable location.

Figure 3:
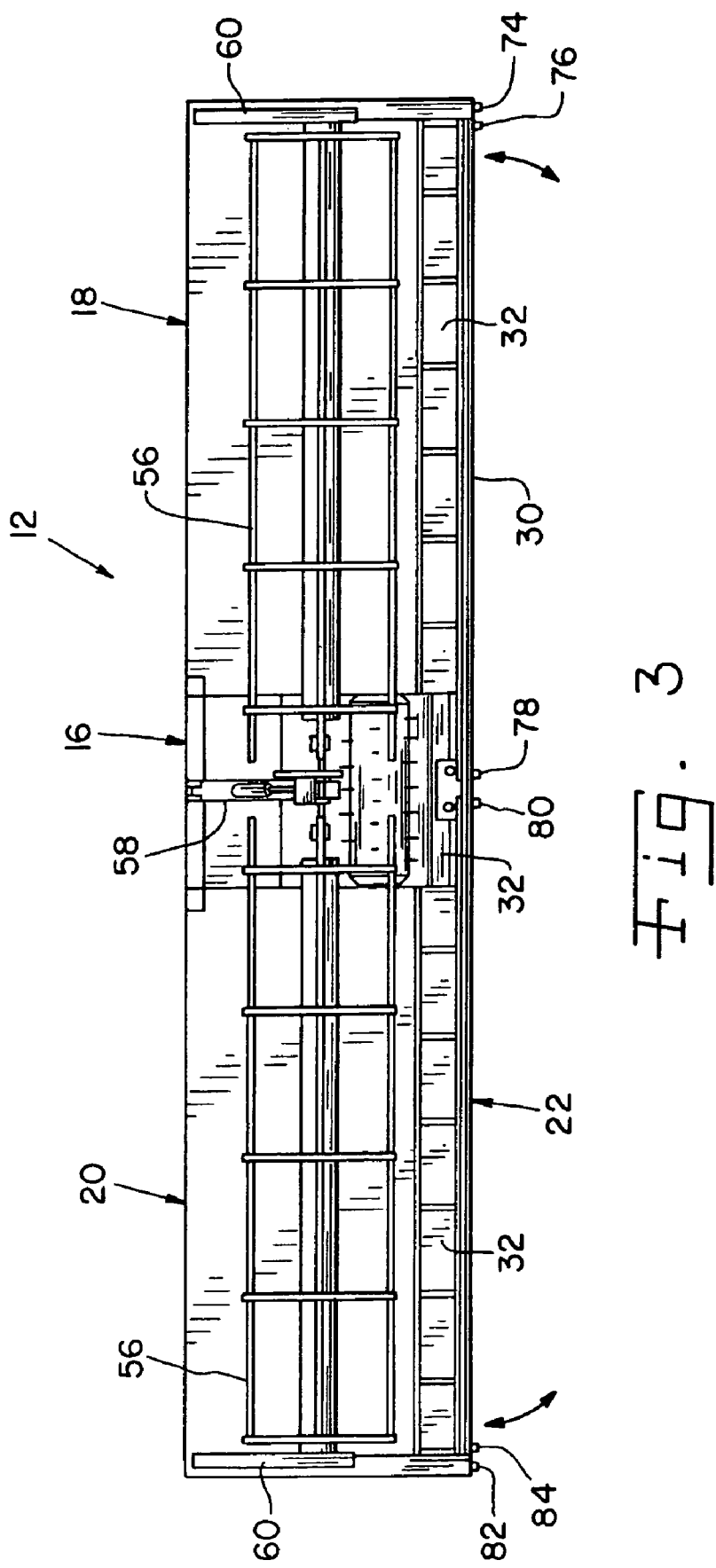
FIG. 3 is a front view of the cutting platform shown in FIGS. 1 and 2.

As shown in FIG. 3, cutting platform 12 includes a plurality of position sensors associated with platform sections 16, 18 and 20, and reels 56. More particularly, first wing platform section 18 includes a height sensor 74 and a tilt sensor 76. Center platform section 16 includes a height sensor 78 and a tilt sensor 80. Second wing platform section 20 likewise includes a height sensor 82 and a tilt sensor 84. The relative positions of the respective sensors 74-84 are indicated along the length of cutting platform 12, but are not intended to indicate the actual positions of the respective sensors. For example, it is possible to position sensors 74, 76 and 82, 84 near the outboard ends of first wing platform section 18 and second wing platform section 20 as shown. However, sensors 74, 76 and 82, 84 would not likely be positioned under the lower surface of cutting platform 12 as shown, where they may come in contact with the ground surface and possibly be damaged. It is more likely that sensors 74-84 would be carried and somewhat protected by a selected float arm 28 associated with each respective platform section 16, 18 and 20.

Figure 4:
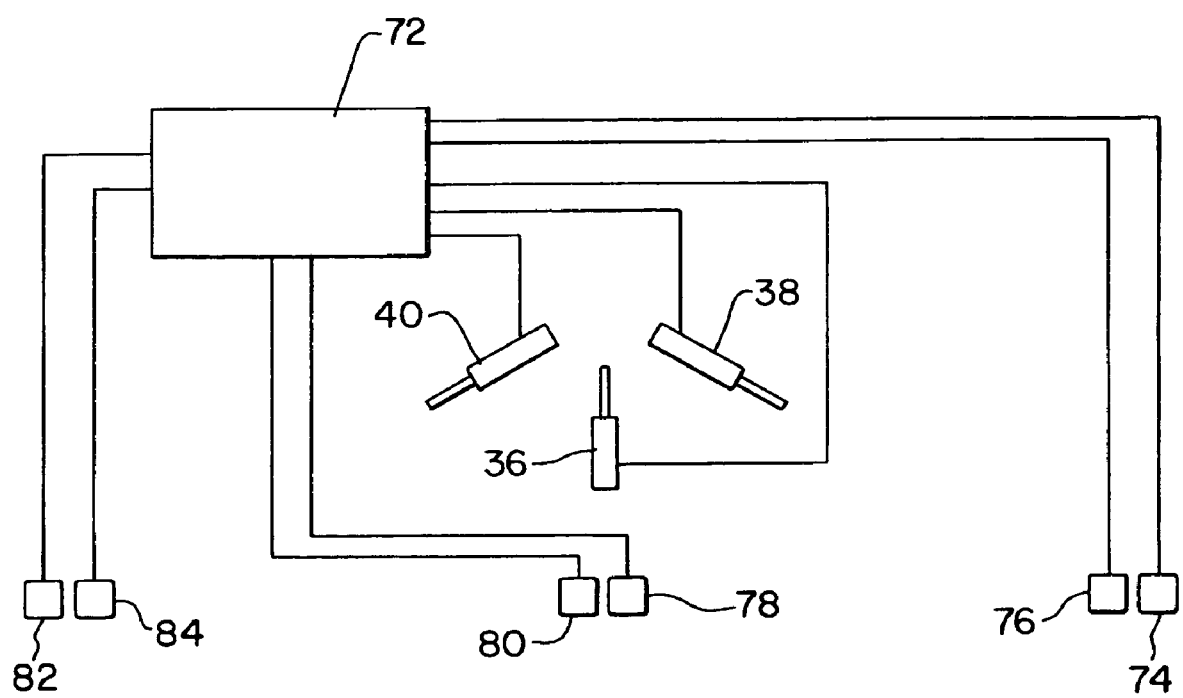
FIG. 4 is a schematic illustration of an embodiment of a height control system of the present invention.

Height and tilt sensors 74-84 are used to determine the relative orientation and operating height of platform sections 16, 18 and 20. The output signals from sensors 74-84 are transmitted to controller 72 onboard combine 10, typically within cab 70 (FIG. 4). It may also be desirable to utilize an output signal from a position sensor (not shown) associated with lift cylinder 66 to determine the height of platform sections 16, 18, and 20.

During harvesting operation, the operating height of center platform section 16 is adjusted using lift cylinder 36, the operating height of first wing platform section 18 is adjusted primarily using first tilt cylinder 38, and the operating height of second wing platform section 20 is adjusted primarily using second tilt cylinder 40. Controller 72 controllably actuates lift cylinder 36, first tilt cylinder 38 and/or second tilt cylinder 40, dependent upon the values of the signals received from sensors 74-84. In this manner, each of center platform section 16, first wing platform section 18 and second wing platform section 20 are substantially maintained at a desired height on a localized basis.

Rather than use a tilt sensor at the outboard ends of first wing platform section 18 and second wing platform section 20, it may also be possible to use a pair of sensors respectively associated with first tilt cylinder 38 and second tilt cylinder 40 representing the tilt angle with respect to center platform section 16. In this manner, the height sensors 74 and 82 at the outboard ends of wing platform sections 18 and 20 are used to maintain a desired clearance distance with the ground, and the sensors associated with tilt cylinders 38 and 40 are used to determine the tilt angle between platform sections 16, 18 and/or 16, 20.

If during operation it is determined that a wing platform section 18 or 20 is at a maximum tilt angle relative to center platform section 16, then it may be necessary to adjust the height of the entire cutting platform using lift cylinder 36. For example, if it is determined using height sensor 74 on first wing platform section 18 that the outboard end thereof needs to be raised, and concurrently it is determined that first wing platform section 18 is already tilted upward at a maximum tilt angle relative to center platform section 16, then controller 72 actuates lift cylinder 36 to raise cutting platform 12. This action may result in the center platform section 16 being positioned higher than desired, but prevents the outboard end of first wing platform section 18 from gouging into the ground. This situation may occur, for example, when harvesting at the base of a sidehill.

As another example, if it is determined using height sensor 78 during harvesting operation that center platform section 16 needs to be lowered, and concurrently it is determined that first wing platform section 18 and second wing platform section 20 are not at a maximum tilt angle relative to center platform section 16, then controller 72 actuates lift cylinder 36 to lower cutting platform section 12, and concurrently actuates tilt cylinders 38 and 40 to raise the outboard ends of wing platform sections 18 and 20 back to a desired height. The extent to which tilt cylinders 38 and 40 are retracted can be easily calculated since the geometries of platform sections 16, 18 and 20 are known.

Having described the preferred embodiment, it will become apparent that various modifications can be made without departing from the scope of the invention as defined in the accompanying claims.

The invention claimed is:

1. An agricultural harvesting machine, comprising:
    a feeder housing;
    a cutting platform including a center platform section carried by said feeder housing, a first wing platform section extending laterally from one side of said center platform section, and a second wing platform section extending laterally from another side of said center platform section;
    a height control system including a lift cylinder coupled with said feeder housing, a first tilt cylinder coupled between said center platform section and said first wing platform section, and a second tilt cylinder coupled between said center platform section and said second wing platform section, wherein said lift cylinder, said first tilt cylinder and said second tilt cylinder are automatically adjusted independent from each other during harvesting operation of said cutting platform; and
    a first height sensor associated with said first wing platform section and providing a first output signal, said height control system being configured to actuate said lift cylinder dependent upon said first output signal and upon detection that said first wing platform section is fully angularly tilted.

2. The agricultural harvesting machine of claim 1, wherein said height control system includes:
    a second height sensor associated with said second wing platform section and providing a second output signal; and
    a third height sensor associated with said center platform section and providing a third output signal;
    wherein said lift cylinder, said first tilt cylinder and said second tilt cylinder are operated independently from each other, dependent upon at least one of said first output signal, said second output signal and said third output signal.

3. The agricultural harvesting machine of claim 2, further including an electronic controller receiving said first output signal, said second output signal and said third output signal, and automatically controlling operation of said lift cylinder, said first tilt cylinder and said second tilt cylinder.

4. The agricultural harvesting machine of claim 3, wherein said electronic controller automatically controls operation of said lift cylinder, said first tilt cylinder and said second tilt cylinder dependent upon more than one of said first output signal, said second output signal and said third output signal.

5. The agricultural harvesting machine of claim 4, wherein if said third output signal indicates that said center platform section is within range and said first output signal indicates that said first wing platform section is out of range, then said first tilt cylinder is adjusted and said lift cylinder is not adjusted.

6. The agricultural harvesting machine of claim 5, wherein an outboard end of said first wing platform section is one of raised and lowered by adjustment of said first tilt cylinder.

7. The agricultural harvesting machine of claim 6, wherein if said second output signal indicates that said second wing platform section is out of range, then said second tilt cylinder is adjusted.

8. The agricultural harvesting machine of claim 7, wherein an outboard end of said second wing platform section is one of raised and lowered by an adjustment of said second tilt cylinder.

9. The agricultural harvesting machine of claim 3, further including
    a first lateral tilt sensor associated with said first wing platform section and providing a first tilt output signal; and
    a second lateral tilt sensor associated with said second wing platform section and providing a second tilt output signal;
    wherein said electronic controller receives said first tilt output signal and said second tilt output signal, and automatically controls operation of said lift cylinder, said first tilt cylinder and said second tilt cylinder dependent upon at least one of said first tilt output signal and said second tilt output signal.

10. The agricultural harvesting machine of claim 1, wherein said lift cylinder, said first tilt cylinder and said second tilt cylinder each comprise a hydraulic cylinder.

11. The agricultural harvesting machine of claim 1, wherein each of said first wing platform section and said second wing platform section can independently be placed in a fixed tilt position and a floating tilt position.

12. A cutting platform for an agricultural harvesting machine, comprising:
  a center platform section;
  a first wing platform section extending laterally from one side of said center platform section;
  a second wing platform section extending laterally from an other side of said center platform section;
  a first height sensor associated with said first wing platform section and providing a first output signal;
  a second height sensor associated with said second wing platform section and providing a second output signal;
  a third height sensor associated with said center platform section and providing a third output signal; and
  a height control system including a lift cylinder coupled to said center platform section, a first tilt cylinder coupled between said center platform section and said first wing platform section, and a second tilt cylinder coupled between said center platform section and said second wing platform section, wherein said first tilt cylinder and said second tilt cylinder are configured to be automatically and independently controlled during harvesting operation of said cutting platform, dependent upon at least one of said first output signal, said second output signal and said third output signal, said height control system being configured to actuate said lift cylinder dependent upon at least one of said first output signal and said second output signal and upon detection that at least one of said first wing platform section and said second wing platform section is fully angularly tilted.

13. The cutting platform of claim 3, further including:
  a first lateral tilt sensor associated with said first wing platform section and providing a first tilt output signal; and
  a second lateral tilt sensor associated with said second wing platform section and providing a second tilt output signal;
  wherein said first tilt cylinder and said second tilt cylinder are configured to be automatically and independently controlled during harvesting operation of said cutting platform, dependent upon at least one of said first tilt output signal and said second tilt output signal.

14. The cutting platform of claim 12, wherein said first tilt cylinder and said second tilt cylinder each comprise a hydraulic cylinder.

15. A method of operating a cutting platform in an agricultural harvesting machine, comprising the steps of:
  sensing a height of a first wing platform section using a first height sensor and providing a first output signal corresponding thereto;
  sensing a height of a second wing platform section using a second height sensor and providing a second output signal corresponding thereto;
  sensing a height of a center platform section using a third height sensor and providing a third output signal corresponding thereto;
  automatically and independently adjusting at least one of a lift cylinder associated with said center platform section, a first tilt cylinder associated with said first wing platform section, and a second tilt cylinder associated with said second wing platform section, dependent upon at least one of said first output signal, said second output signal and said third output signal; and
  actuating said lift cylinder dependent upon at least one of said first output signal and said second output signal and upon detection that at least one of said first wing platform section and said second wing platform section is fully angularly tilted.

16. The method of operating a cutting platform of claim 15, further including the steps of:
  sensing a tilt of said first wing platform section using a first lateral tilt sensor and providing a first tilt output signal corresponding thereto;
  sensing a tilt of said second wing platform section using a second lateral tilt sensor and providing a second tilt output signal corresponding thereto;
  wherein said automatically and independently adjusting step includes adjusting at least one of said lift cylinder, said first tilt cylinder and said second tilt cylinder, dependent upon at least one of said first tilt output signal and said second tilt output signal.

17. The method of operating a cutting platform of claim 15, wherein if said third output signal indicates that said center platform section is within range and said first output signal indicates that said first wing platform section is out of range, then said automatically and independently adjusting step includes adjusting said first tilt cylinder and not adjusting said lift cylinder.

18. The method of operating a cutting platform of claim 17, wherein if said second output signal indicates that said second wing platform section is out of range, then said automatically and independently adjusting step also includes adjusting said second tilt cylinder and not adjusting said lift cylinder.

* * * * *